Feb. 7, 1961   R. A. COLEMAN ET AL   2,970,620
APPARATUS FOR REMOVING UNDESIRABLE MATERIAL FROM
ROOT CROPS PRIOR TO PROCESSING
Filed July 28, 1958   2 Sheets-Sheet 2

INVENTORS
Richard A. Coleman and
Lawrence H. Long,
BY
ATTORNEY

United States Patent Office 2,970,620
Patented Feb. 7, 1961

2,970,620
APPARATUS FOR REMOVING UNDESIRABLE MATERIAL FROM ROOT CROPS PRIOR TO PROCESSING

Richard A. Coleman and Lawrence H. Long, Harrisburg, Pa., assignors to J. D. Ferry Co., Inc., Harrisburg, Pa., a corporation of Pennsylvania Filed July 28, 1958, Ser. No. 751,422

7 Claims. (Cl. 146—55)

This invention relates to apparatus for removing sprouts, stems, adherent earth and similar undesirable materials from the exterior portions of vegetables preparatory to the peeling, slicing and/or other processing thereof, and has for its principal object the provision of a machine capable of continuously rapidly and efficiently performing such functions in large scale commercial operations. As an illustrative but not limiting example of a field to which the apparatus is particularly adapted, the commercial production of potato chips and similar vegetable products may be cited.

As received by the processor, potatoes usually have substantial quantities of earth, vine fragments, sprouts, etc. attached or adhering to their outer portions. Such undesirable matter may amount to 10% or more of the weight of a batch and if not separated and removed prior to passage of the vegetables through the peeling machines commonly employed in large scale commercial production, it may give considerable trouble in and actually cause damage to such machines. Furthermore, because of the fibrous nature of at least some of the waste components, in many localities sewage authorities prohibit deposit of potato peelings and similar processing plant waste into the sewers since it tends to clog the filters and/or other units of the sewage treatment plants and seriously inerfere with their proper functioning.

By passing the vegetables through the present apparatus prior to introducing them into the peeling and/or other units of the processing plant the undesirable components may be efficiently separated therefrom and segregated for disposal in an acceptable manner.

A typical example of a machine constructed in accordance with the present invention is illustrated in the accompanying drawings constituting a part of this specification, in which like reference characters designate like parts throughout the views, and in which.

Figure 1:
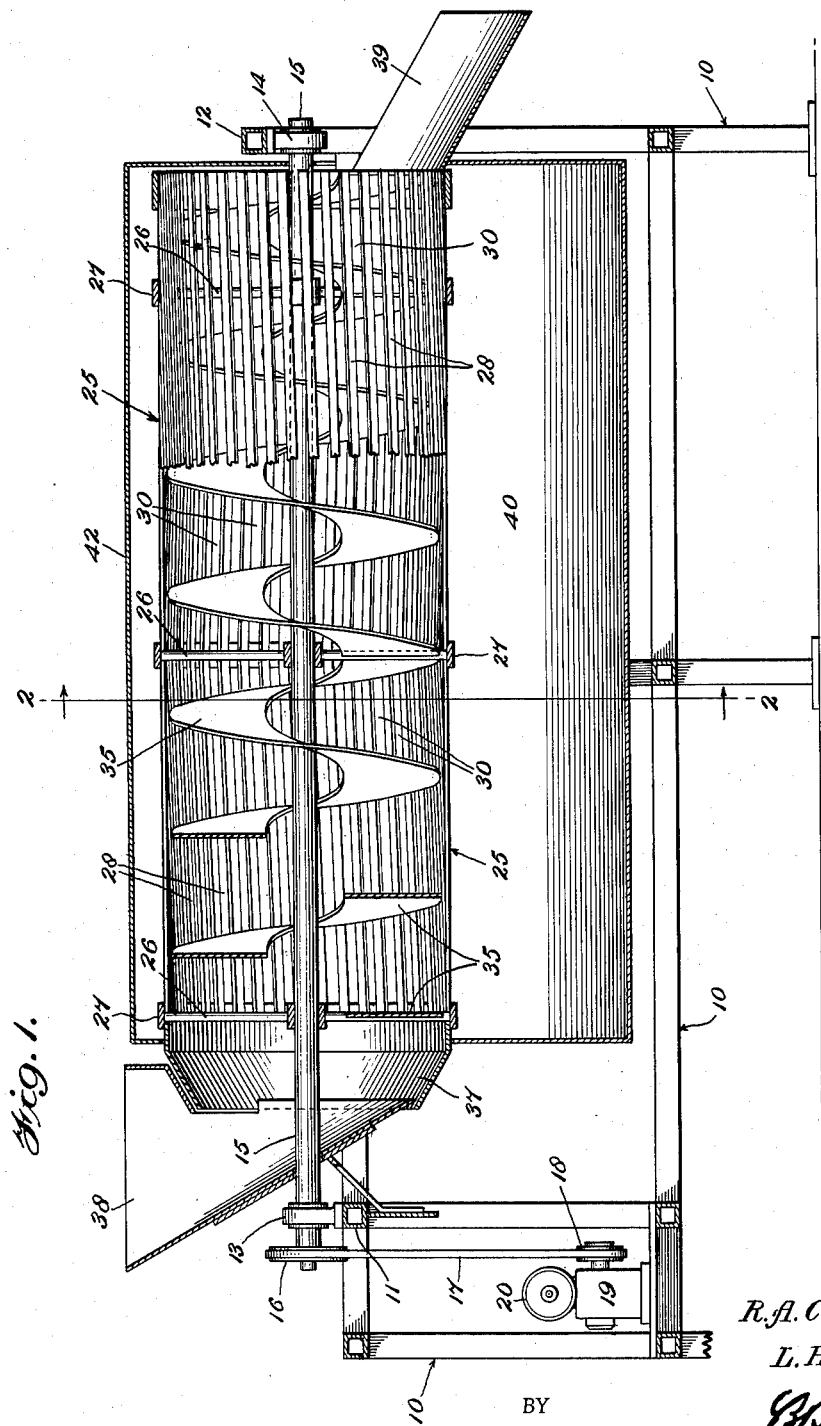
Figure 1 is a central longitudinal sectional view, partly in elevation, of the machine.

Referring to the said drawings in greater detail, as there shown the machine comprises a supporting framework 10, the upper transverse members 11 and 12 of which support bearings 13 and 14 in which is journaled a horizontal shaft 15. One end portion of said shaft fixedly carries a pulley or sprocket 16 engaged by a belt or chain 17 which is also trained about a pulley or sprocket 18 that is carried by the output shaft of a speed-reducing mechanism 19 that is driven by a motor 20.

A tubular receptacle or drum structure 25 is rigidly mounted on the shaft 15 for rotation therewith, which structure comprises a plurality of longitudinally spaced spoked wheels or spiders 26 to the annular rims 27 of which are rigidly secured the end portions of a multiplicity of peripherally spaced longitudinally extending shear elements 28. These elements may conveniently take the form of metal bars of rectangular or other suitable polygonal cross section, the corners 29 of which constitute cutting edges serving to sever the sprouts, stems, vine fragments, etc. from the vegetables when the latter are brought into contact with the bars, as will presently appear.

Although the elements 28 extend generally longitudinally of the drum structure they preferably are disposed in a more or less slanted or skewed relation to its axis, as this has been found in practice to appreciably facilitate the dislodgment of the undesirable matter from the vegetables. The skewing may be unidirectional from end to end of the structure, or some of the bars may be skewed in one direction and some in another direction. For example, in Fig. 1 the bars extending from the left-hand or receiving end of the drum to its mid section are slanted in one direction, while those extending from said mid section to the right-hand or discharging end are slanted in an opposite direction. The spacing of the shear elements is such as to prevent vegetables introduced into the drum from passing through the apertures 30 between the elements although the separated undesirable material may do so.

Figure 3:
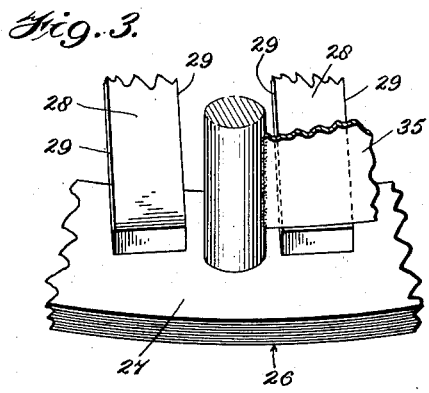
Fig. 3 is a detail perspective view on a still larger scale of a small portion of one end of the vegetable-receiving drum.

A helical flight 35 of relatively low pitch is mounted within the drum 25, being conveniently secured to and supported by the spokes of the several spiders 26, as shown in Figs. 1 and 3. The said flight projects inwardly from substantially the inner face of the peripheral wall provided by the shear bars 28, and in conjunction therewith provides a helical channel extending from end to end of the drum, along which the vegetables are moved as a result of rotation of the drum.

At its receiving end the drum is provided with an apron 37 of truncated conical form which is adapted to receive the vegetables from a supply hopper 38 that is suitably supported by the framework 10; and at the other end of the drum there is provided a frame mounted discharge chute 39 arranged to receive the vegetables from the interior of the drum. A refuse bin or chamber 40, equipped with one or more discharge doors 41, is provided beneath the drum 25, while a dust confining hood 42 extends over it.

Figure 2:
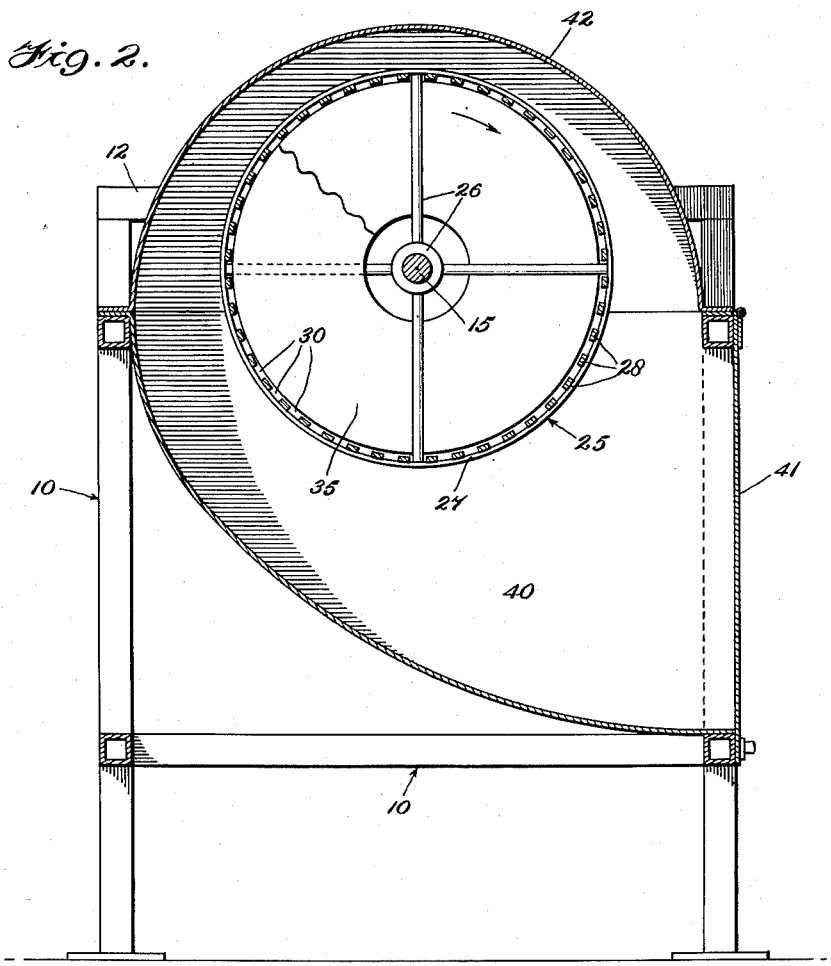
Fig. 2 is a transverse sectional view on a somewhat larger scale, on the plane indicated by the line 2—2 in Fig. 1, looking in the direction of the arrows.
Figure 4:
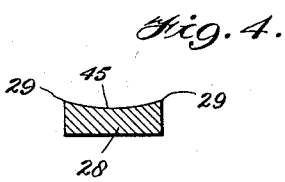
Fig. 4 is an enlarged cross sectional view illustrating the conformation of one type of shear element that may be employed.

As previously indicated, the shear elements 28 may be of conventional rectangular cross section as shown in Figs. 2 and 3, but in some instances the inward faces thereof may be hollow-ground to a transversely concave form, as indicated at 45 in Fig. 4.

When the vegetables are fed from the hopper 38 into the lower portion of the receiving end of the drum they enter the helical channel provided by the flight 35 and as the drum structure is rotated by the drive mechanism 16, 17, 18, 19 and 20 they tend to be carried up with the rising sector of the drum wall, being thereby tumbled over and over in said channel and worked along it by the flight to the discharge end of the drum. The outer surfaces of the vegetables are thus brought into substantially constantly changing engagement with the shear elements 28 and the obliquely extending cutting edges 29 thereof, and this action has been found to effectively sever or dislodge the sprouts, stems, small protuberances, dirt and other undesirable material initially carried by the vegetables. Such dislodged material escapes through the apertures 30 to the refuse bin 40 from which it may be periodically removed for suitable disposal, while the sheared vegetables emerge into the chute 39 in a condition quite satisfactory for transfer to a peeling, slicing or other unit of the processing plant.

What is claimed is:

1. Apparatus for dislodging and separating sprouts, stems and other undesirable material from potatoes and similar vegetables preparatory to the peeling, slicing or other processing thereof, said apparatus comprising a horizontally disposed drum structure mounted for rotation about its longitudinal axis, the peripheral wall of such structure comprising a multiplicity of transversely spaced longitudinally extending shear elements provided with cutting edges; means connected to said drum for rotating the same; means mounted adjacent to and co-operating with one end of the drum for feeding vegetables into the latter; means mounted within the drum arranged to positively move the vegetables from said drum end to the other end thereof as the drum is rotated, with the outer portions of the vegetables in constantly changing engagement with said cutting edges of the shear elements, whereby to detach the undesirable matter from the vegetables for escape of such material through the spaces between the shear elements; and means mounted adjacent to and co-operating with said other end of the drum for receiving the sheared vegetables therefrom.

2. Apparatus for detaching and separating sprouts, stems and other undesirable material from potatoes and similar vegetables preparatory to the peeling, slicing or other processing thereof, said apparatus comprising a horizontally disposed drum structure mounted for rotation about its longitudinal axis, the peripheral wall of such structure comprising a multiplicity of transversely spaced longitudinally extending shear elements having corners providing cutting edges; means mounted within the drum providing a continuous channel along the inward face of said peripheral wall extending substantially from end to end of the drum; means mounted adjacent to and co-operating with one end of the drum for feeding vegetables into the latter; means connected to said drum for rotating the same whereby to traverse the vegetables along said channel with their outward portions in constantly changing engagement with said cutting edges of the shear elements to thereby dislodge the undesirable material from the vegetables for escape of such material through the spaces between the shear elements; and means mounted adjacent to and co-operating with the other end of the drum for receiving the sheared vegetables from the interior thereof.

3. Apparatus for detaching and separating sprouts, stems, vine fragments and other undesirable material from potatoes and similar vegetables preparatory to the peeling, slicing or other processing thereof, said apparatus comprising a horizontally disposed drum structure mounted for rotation about its longitudinal axis, the peripheral wall of such structure comprising a multiplicity of peripherally spaced longitudinally extending shear elements of polygonal cross section providing cutting edges at their corners; a helical flight mounted within the drum providing a continuous channel along the inward face of said peripheral wall extending from end to end of the drum; means mounted adjacent to and co-operating with one end of the drum for feeding vegetables into the latter; means connected to said drum for rotating the same whereby to tumble the vegetables along said channel with their outward portions in constantly changing engagement with the cutting edges of said shear elements to thereby dislodge the undesirable material from the vegetables for escape of such material from the drum through the spaces between the shear elements; and means mounted adjacent to and co-operating with the other end of the drum for receiving the sheared vegetables from the interior thereof.

4. Apparatus according to claim 3, wherein the shear elements comprise metal bars arranged in skewed relation about the drum perimeter thereby disposing their cutting edges obliquely with respect to the longitudinal axis.

5. Apparatus according to claim 4, wherein some of the shear elements are slanted in one direction and some in another direction.

6. Apparatus according to claim 4, wherein the shear elements extending from the receiving end of the drum to its mid portion are skewed in one direction and the elements in the remaining portion of the drum are skewed in the other direction.

7. Apparatus according to claim 3, wherein the inward faces of the bars are transversely concave.

References Cited in the file of this patent

FOREIGN PATENTS

| | | |
|---|---|---|
| 475,307 | Germany | Apr. 22, 1929 |
| 569,653 | Germany | Feb. 6, 1933 |
| 1,008,437 | France | Feb. 20, 1952 |
| 1,022,732 | France | Dec. 17, 1952 |